(12) United States Patent
Stewart et al.

(10) Patent No.: US 12,615,294 B1
(45) Date of Patent: Apr. 28, 2026

(54) HONEY REPOSITORY

(71) Applicant: Rapid7, Inc., Boston, MA (US)

(72) Inventors: Owen Stewart, Belfast (GB); Ashwin Anand, Acton, MA (US)

(73) Assignee: Rapid7, Inc., Boston, MA (US)

( * ) Notice: Subject to any disclaimer, the term of this patent is extended or adjusted under 35 U.S.C. 154(b) by 408 days.

(21) Appl. No.: 17/964,169

(22) Filed: Oct. 12, 2022

(51) Int. Cl.
H04L 9/40 (2022.01)

(52) U.S. Cl.
CPC ...... H04L 63/1491 (2013.01); H04L 63/1416 (2013.01)

(58) Field of Classification Search
CPC ............. H04L 63/1425; H04L 63/1441; H04L 63/1491; H04L 63/1408
See application file for complete search history.

(56) References Cited

U.S. PATENT DOCUMENTS

| | | | | |
|---|---|---|---|---|
| 7,093,291 | B2 | 8/2006 | Bailey | |
| 8,973,142 | B2 | 3/2015 | Shulman et al. | |
| 9,923,908 | B2 * | 3/2018 | Boss | H04L 63/1491 |
| 10,333,976 | B1 * | 6/2019 | Yudovich | H04L 63/1416 |
| 10,397,273 | B1 | 8/2019 | Stickle et al. | |
| 10,574,698 | B1 | 2/2020 | Sharifi Mehr | |
| 10,873,601 | B1 * | 12/2020 | Stickle | H04L 63/1416 |

| | | | | |
|---|---|---|---|---|
| 2016/0366099 | A1 | 12/2016 | Jordan | |
| 2017/0099305 | A1 * | 4/2017 | Schwartz | H04L 63/20 |
| 2017/0134423 | A1 * | 5/2017 | Sysman | G06F 21/554 |
| 2017/0163682 | A1 * | 6/2017 | Yu | H04L 63/1491 |
| 2017/0244749 | A1 * | 8/2017 | Shulman | H04L 63/1441 |
| 2018/0034835 | A1 | 2/2018 | Iwanir et al. | |
| 2019/0356661 | A1 * | 11/2019 | Hecht | H04L 9/0891 |
| 2020/0204527 | A1 * | 6/2020 | Vass | H04L 63/0428 |
| 2020/0389487 | A1 * | 12/2020 | Zhauniarovich | H04L 63/1491 |
| 2021/0240551 | A1 * | 8/2021 | Joyce | H04L 67/02 |
| 2022/0217177 | A1 * | 7/2022 | Beaver | H04L 63/1466 |
| 2022/0311794 | A1 * | 9/2022 | Maya | G06F 11/0766 |

* cited by examiner

*Primary Examiner* — Tae K Kim
(74) *Attorney, Agent, or Firm* — Ashwin Anand

(57) ABSTRACT

Embodiments disclose a honeyrepo implemented in a cyber-security computing environment. A honey repository is configured for inclusion in a source control system by a detection and response server that is communicatively coupled to a continuous integration system that accesses a shared repository and has access to individual repositories of the source control system by generating a honey repository configuration package that includes decoy metadata to entice an attacker to initiate a request to access the honey repository. The honey repository configuration package that includes the decoy metadata is transmitted to the source control system to generate the honey repository and access to the source control system is monitored at the detection and response server. If an attacker initiates the request to access the honey repository, access is disabled for the attacker to the individual repositories of the source control system and the shared repository managed by the continuous integration system.

11 Claims, 5 Drawing Sheets

300

400

Start

Confirm attacker request to access honey repository
405

Instruct SCS to disable access to individual repositories
410

Instruct CIS to disable access to shared repository
415

Interrupt ongoing unit test
420

Prevent start of subsequent unit test(s)
425

Prevent commit(s) to shared repository
430

End

HONEY REPOSITORY

BACKGROUND

Field of the Disclosure

This disclosure is related is to performing extended incident detection and response (XDR) operations in computing environments that implement cloud-based source control systems and continuous integration systems for code management.

Description of the Related Art

In software engineering, version control (also known as revision control, source control, or source code management) involves managing changes to applications, programs, documents, websites, and other collections of data. Version control systems (also called source control systems, e.g., GitHub® that uses Git®, among others) implement and require repositories for code management. Repositories are data structure that store metadata for a set of files or directory structure.

Continuous integration (CI) systems enable several developers to contribute to the same software project in a cohesive manner. CI systems merge working copies (of individual developer work product) to a shared mainline several times within a given timeframe. CI systems are routinely integrated with source (or version) control systems to manage complex software development tasks. Unfortunately, this is where security-related issues arise with respect to crucial data that is managed by such repositories.

Repositories typically contain a company's most valuable data in terms of source code and intellectual property. Therefore, it is not surprising that repositories are frequent targets of malicious attackers who can not only corrupt source code, but also use the intrusion to gain access to other systems-a problem that is exacerbated by shared repositories that are accessed by multiple developers. Enhanced repository management in cybersecurity computing environments requires a technical solution.

SUMMARY OF THE DISCLOSURE

Embodiments disclose various computing methods, systems, and processes that enable the protection of source control systems from malicious attacks using a honey repository. A detection and response (D&R) server that is communicatively coupled to a continuous integration system that manages a shared repository and has access to individual repositories of a source control system configures a honey repository for inclusion in the source control system by generating a honey repository configuration package (HRCP) that includes decoy metadata to entice an attacker to initiate a request to access the honey repository. The D&R server at least (1) transmits the HRCP that includes the decoy metadata to the source control system with instructions to generate the honey repository, (2) monitors access to the source control system, and (3) determines that the attacker has initiated the request to access the honey repository. In addition, and in response to the request by the attacker, the D&R server transmits instructions to the continuous integration system to disable access for the attacker to the individual repositories of the source control system and the shared repository managed by the continuous integration system, respectively.

In one embodiment, the decoy metadata includes at least a license file, a baseline, a branch, a change list, a working copy, or a tag composed of decoy code or decoy data to entice the attacker.

In another embodiment, the D&R server accesses a list of potential honey repositories via an integration between the source control system and the D&R server. In this example, the potential honey repositories (a) include at least the honey repository and (b) are not accessible by or visible to users of the source control system or the continuous integration system.

In certain embodiments, as part of disabling access for the attacker, the D&R server, the continuous integration system, and the source control system(s), either alone or in combination, (a) interrupt an ongoing unit test and (b) prevent (the) start of subsequent unit tests and commits to the shared repository managed by the continuous integration system.

In some embodiments, the D&R server, the continuous integration system, and the source control system(s), either alone or in combination: (a) take offline an individual repository that has a higher number of commits than any other individual repository and (b) execute a security orchestration and automation (SOAR) workflow to trigger the disabling access, the interrupting, and the taking offline, with respect to the foregoing paragraphs.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent by referencing the accompanying drawings and/or figures.

Figure 1:
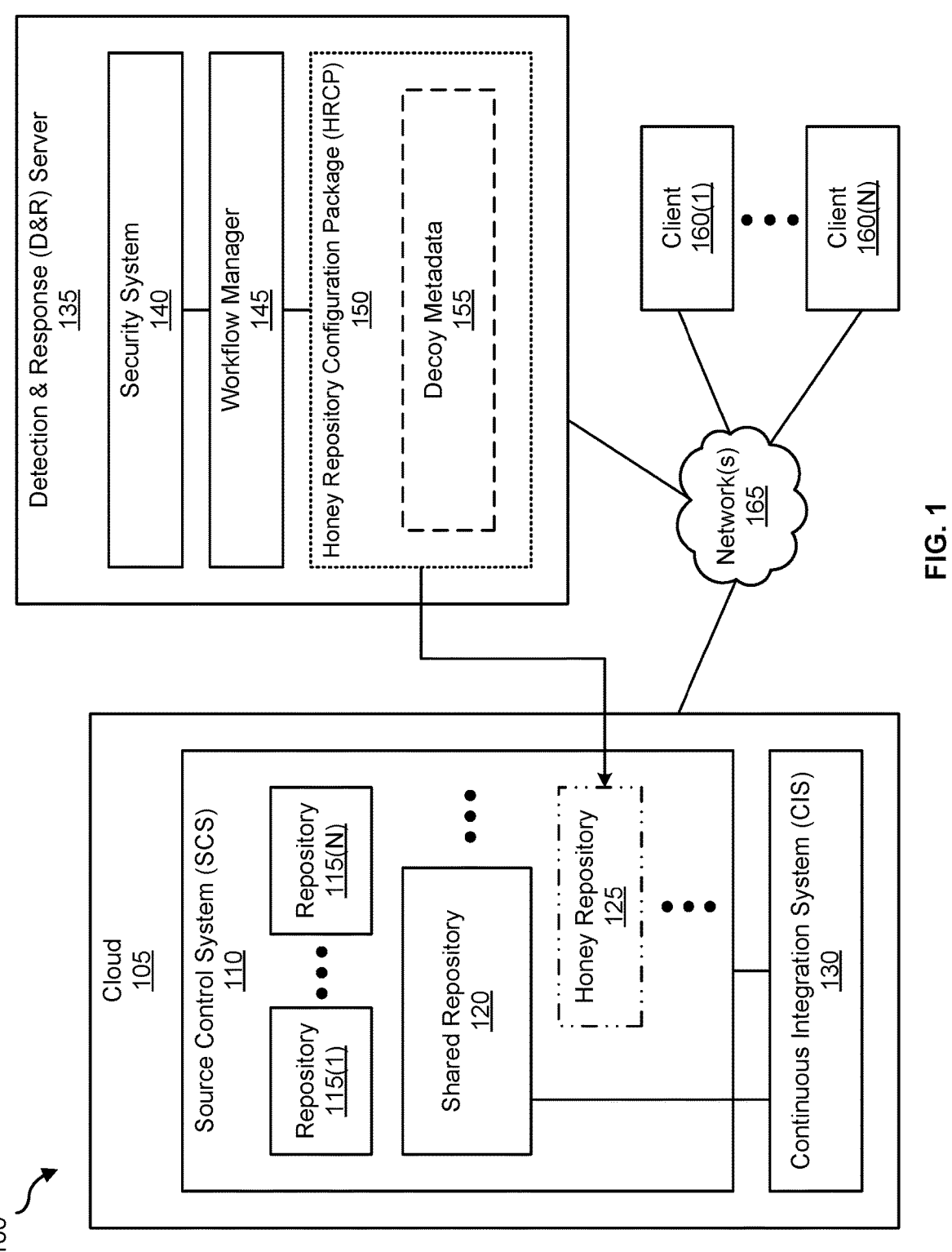
FIG. 1 is a block diagram 100 of a source control system (SCS) and a continuous integration system (CIS) integrated with a detection and response (D&R) server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

In software development, distributed version control (also known as distributed revision control) is a form of version control in which the complete codebase, including the full history, is mirrored on each software developer's computer. Distributed version control enables automatic management of branching and merging. Branching is the duplication of an object under version control (e.g., a source code file or a directory tree). Each object can thereafter be modified separately and in parallel so that the objects become different. In this context, the objects are called branches and the users of a version control system (e.g., GitHub®) can branch any branch. Branches are also called trees, streams, or codelines. Merging (also called integration) is an operation that reconciles multiple changes made to a version-controlled collection of files and is necessary when a file is modified on two independent branches and subsequently merged. The result is a single collection of files that contains both sets of changes.

For example, distributed version control software such as Git® tracks changes in a set of files and coordinates work among programmers collaboratively developing source code during software development. After software such as Git® is installed, it can be initialized into a project to create a new repository. For example, in Git®, a repository is the .git/ folder inside a project (also called a repository folder). The repository tracks all changes to files in the project and builds a history over time. As noted, a repository contains project files and each file's revision history permitting discussion and management of a project's work within the repository. Repositories can be owned individually or ownership can be shared with several users in an organization. A repository's visibility can also be restricted.

A pull request (also called a merge request) is an event that takes place when a contributor or developer is ready to begin the process of merging new code changes with the main project repository. The pull request informs other developers about changes that have been pushed to a branch in a repository. Once a pull request is opened, proposed changes can be discussed and reviewed between collaborators, before follow-up commits are added and the changes are merged into the base branch.

As previously noted, version control (also known as revision control, source control, or source code management) involves managing code-based modifications to applications, programs, documents, websites, and other collections of data. For code management purposes, version control systems implement and require repositories that are used simultaneously by multiple programmers in modern software development environments. Also as noted, repositories are data structures that store metadata for a set of files or directory structure and typically contain a company's most valuable data in terms of source code and intellectual property. Therefore, it is not surprising that repositories are frequent targets of malicious attackers who can not only corrupt source code, but also use the intrusion to gain access to other systems-a problem that is exacerbated by shared repositories that are accessed by multiple developers.

Continuous integration (CI) systems (or servers) enable several developers to contribute to the same software project in a cohesive manner. Examples of such server-based CI systems include Jenkins or Team City, among others. They help automate parts of software development related to building, testing, and deployment by facilitating continuous integration (CI) and continuous delivery (CD) (referred to as a CI/CD pipeline) and support version control tools such as AccuRev, CVS, Subversion, Git, Mercurial, Perforce, ClearCase, and RTC, among others.

CI systems merge working copies (of individual developer work product) to a shared mainline several times within a given timeframe. CI systems are routinely integrated with source (or version) control systems to manage complex software development tasks. Unfortunately, this is where security-related issues arise with respect to crucial data that is managed by such repositories. Enhanced repository management in cybersecurity computing environments requires a technical solution. CI systems monitor and interact with source control systems such as GitHub®, Team Foundation Server, BitBucket, and the like. CI systems respond to check-ins, changes, or build requests and download source code from the source control system (e.g., to compile code and run tests or to compile code for release). In a typical implementation, because of their access to shared repositories, CI systems are usually restricted to administrator accounts rather than regular user accounts on a network.

Unfortunately, given the complex and distributed nature in which source control systems and CI servers access, use, and manage repositories, organizations are often unaware that their source control systems are being targeted until it is too late. Unauthorized access to a source control repository can lead to intellectual property theft or malicious code being discreetly planted into a codebase. Disclosed herein are methods, systems, and processes to configure, generate, and/or implement a honey repository (also called a honey-repo) to enhance repository security for source/version control systems in modern software development environments.

FIG. 1 is a block diagram 100 of a source control system (SCS) 110 and a continuous integration system (CIS) 130 integrated with a detection and response (D&R) server 135, according to one embodiment. Cloud 105 is a cloud computing platform (e.g., Amazon Web Services, Microsoft Azure, Google Cloud, among others) that can implement and execute SCS 110 and CIS 130. SCS 110 and CIS 130 can be one or more physical or virtual computing devices (e.g., computers, virtual machines, containers, servers, and the like). Examples of SCS 110 include, but are not limited to, GitHub®, Team Foundation Server, BitBucket, AccuRev, CVS, Subversion, Git, Mercurial, Perforce, ClearCase, RTC, and the like, and examples of CIS 130 include, but are not limited to, Jenkins, Team City, and the like.

SCS 110 includes at least repositories 115(1)-(N) and a shared repository 120. SCS 110 is also where a honey repository 125 (also called honeyrepo) is created and implemented, as disclosed and described herein. SCS 110 is communicatively coupled to CIS 130, either as part of cloud 105, or separately. As noted, a repository such as repository 115(A) is a data structure that store metadata for a set of files or directory structure. Each repository of respositories 115 (A)-(N) can store metadata for a different set (or group) of files and is generally used and accessed by either a single user or a small group of users (e.g., a team of three programmers working on a specific coding project that is a part of a larger software product). Therefore, access to individual repositories of respositories 115(A)-(N) is restricted to certain authorized users of SCS 110. As such, each repository of respositories 115(A)-(N) can have its own content-based "personality" (e.g., based on requirements of a given software development task).

However, on the other hand, shared repository 120 stores metadata for multiple sets (or groups) of files and is generally used and accessed by a large group of users (e.g., a team of thirty programmers working on the large software product). Therefore, access to shared repository 120 in modern software development environments is generally provided to more or less all authorized users of CIS 130. Unfortunately, these varying levels of access and content differentiation between multiple individual repositories and one or more shared repositories in the same software development environment can render modern access control mechanisms ineffective in preventing a malicious attacker from gaining illegitimate access to a given repository (whether individual or shared).

Therefore, in one embodiment, and as shown in FIG. 1, D&R server 135 is implemented to generate honeyrepo 125 in SCS 110. D&R server 135 can also be any type of physical or virtual computing device and can be implemented as part of cloud 105 or can be implemented separately (e.g., as shown in FIG. 1, communicatively coupled to cloud 105 via network 165). D&R server 135 includes at least a security system 140, a workflow manager 145, and a honey repository configuration package (HRCP) 150. HRCP 150 includes decoy metadata 155. Also as shown in FIG. 1, D&R server 135 and clients 160(1)-(N), which can be any type of physical or virtual computing devices, are communicatively coupled to cloud 105 via network 165, which can be any form of network or interconnection. In this example, clients 160(1)-(N) are users of one or more repositories 115(A)-(N) of SCS 110 (e.g., software developers).

In one embodiment, D&R server 135 that is communicatively coupled to CIS 130 (e.g., as part of cloud 105) that manages shared repository 120 and has access to repositories 115(1)-(N) of SCS 110 configures honey repository 125 for inclusion in SCS 110 by generating HRCP 150 that includes decoy metadata 155 to entice an attacker to initiate a request to access honey repository 125. In this example, D&R server 135 at least (1) transmits HRCP 150 that includes decoy metadata 155 to SCS 110 with a first set of instructions to generate honey repository 125, (2) monitors access to SCS 110, and (3) determines that an attacker (who is not part of (authorized) clients 160(1)-(N)) has initiated the request to access honey repository 125. In addition, and in response to the request by the attacker, D&R server 135 transmits a second set of instructions to SCS 110 and CIS 130 to disable access for the attacker to one or more of repositories 115(1)-(N) of SCS 110 and shared repository 120 managed by CIS 130, respectively. Access to SCS 110 is monitored by security system 140, which includes incident detection and response (IDR) as well as vulnerability risk management (VRM) capabilities. Security system 140 includes a catalog of authorized clients permitted to access SCS 110, and in particular, one or more clients 160(1)-(N) authorized to access one or more repositories 115(1)-(N) managed by SCS 110. In one embodiment, honey repository 125 is generated based on decoy metadata 155 that mimics the content(s) of one or more repositories 115(1)-(N), either fully or at least substantially. In another embodiment, honey repository 125 is generated based on the decoy metadata 155 that mimics the content(s) of a given repository that was previously sought to be accessed by a user who is not part of clients 160(1)-(N) (e.g., a potentially malicious user or attacker).

Figure 2:
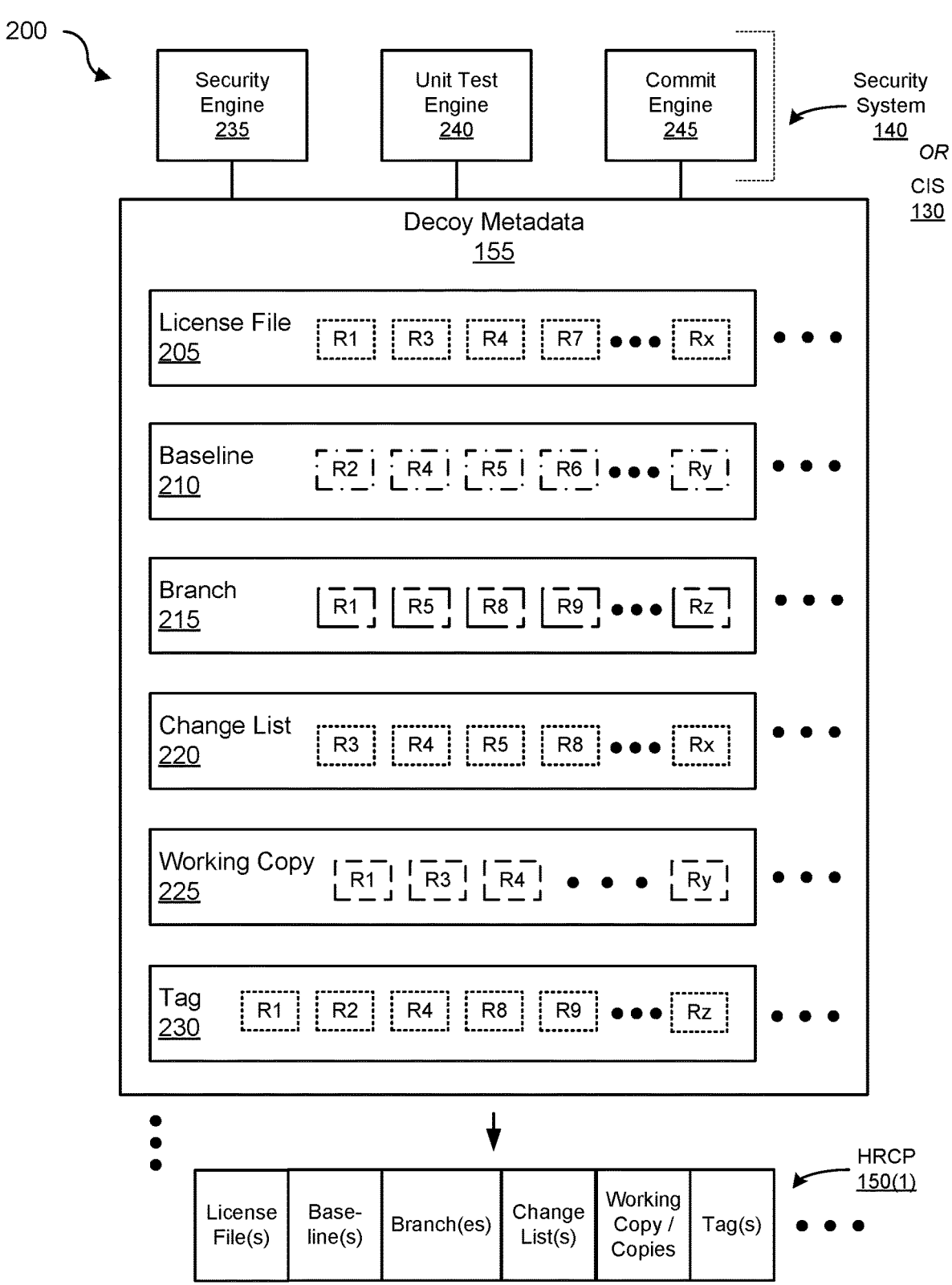
FIG. 2 is a block diagram 200 of decoy metadata that is part of a honey repository configuration package (HRCP), according to one embodiment of the present disclosure.

FIG. 2 is a block diagram 200 of decoy metadata 155 that is part of HRCP 150, according to one embodiment. Security system 140 includes at least a security engine 235 to detect an attacker's malicious access to one or more repositories (e.g., based on access logs) or request for illegitimate authorization to access the one or more repositories. Security system 140 includes a unit test engine 240 to interrupt one or more ongoing unit tests and prevent (the) start of one or more subsequent unit tests related to code that is (a) part of one or more repositories being actively accessed by the attacker or (b) sought to be accessed by the attacker. A unit test involves testing individual units of source code to determine the source code's fitness for use. Because individual units of code are typically held in individual repositories (e.g., in one or more of repositories 115(1)-(N)), it is advantageous to interrupt ongoing unit tests to prevent maliciously conducted unit tests from certifying code as fit for use. Such code can be corrupted, can include trojan horses for future execution, and the like. Security system further includes a commit engine 245 to block commits to at least shared repository managed 120 by CIS 130. A commit is an operation which sends latest changes of source code to shared repository 120. Given that shared repository 120 typically contains important source code that is being simultaneously developed by multiple programmers, preventing commits by an attacker to shared repository 120 is particularly advantageous in preventing malicious modification of extensive source code.

In certain embodiments, decoy metadata 155 includes at least a license file 205, a baseline 210, a branch 215, a change list 220, a working copy 225, and/or a tag 230 composed of decoy code or decoy data to entice the attacker. Decoy metadata 155 is modeled after (or generated based on) the contents of one or more repositories managed by SCS 110 (e.g., by mimicking, at least partially, metadata or data structures indicative of the contents of repositories 115(1)-(N)). Each repository of repositories 115(1)-(N) as well as shared repository 120 includes a unique combination of a non-decoy license file, a non-decoy baseline, a non-decoy branch, a non-decoy change list, a non-decoy working copy, and/or a non-decoy tag. In some embodiments, and as shown in FIG. 2, (decoy) license file 205, (decoy) baseline 210, (decoy) branch 215, (decoy) change list 220, (decoy) working copy 225, and/or (decoy) tag 230 can include mimicked non-decoy portions (e.g., metadata and/or data structures indicative thereof) of license files, baselines, branches, change lists, working copies, and/or tags from one or more respositories to configure HRCP 150(1).

In other embodiments, mimicked decoy portions of license files 205(1)-(N), baselines 210(1)-(N), branches 215 (1)-(N), change lists 220(1)-(N), working copies 225(1)-(N), and/or tags 230(1)-(N) only include metadata and/or data structures that resemble, for example substantially, real license files, baselines, branches, change lists, working copies, and/or tags (e.g., to entice an attacker) but do not include the actual/real license files, baselines, branches, change lists, working copies, and/or tags themselves. For example, (1) (decoy) license file 205 can mimic all or portions of one or more non-decoy license files from repositories 115(1), 115(3), 115(4), 115(7), and/or 115(x), (2) (decoy) baseline 210 can mimic all or portions of non-decoy baselines from repositories 115(2), 115(4), 115(5), 115(6), and/or 115(y), (3) (decoy) branch 215 can mimic all or portions of non-decoy branches from repositories 115(1), 115(5), 115(8), 115(9), and/or 115(z), (4) (decoy) change list 220 can mimic all or portions of non-decoy change lists from repositories 115(3), 115(4), 115(5), 115(8), and/or 115(x), (5) (decoy) working copy 225 can mimic all or portions of non-decoy working copies from repositories 115(1), 115(3), 115(4), and/or 115(y), and (6) (decoy) tag 230 can mimic all or portions of non-decoy tags from repositories 115(1), 115(2), 115(4), 115(8), 115(9), and/or 115(z).

License file 205 can be any type of file (e.g., typically a text file) that indicates licensing terms for code in a repository (e.g., open source license, or any other type of commercial or non-commercial license). Baseline 210 is a repository object that records the state of a component at a specific time. Baselines are created at significant points in a software model's development to enable comparison of an evolved model at a future point in time to the baseline at a given level of granularity (and to enable restoration of prior content). Branch 215 represents an independent line of development and serves as an abstraction for the edit, stage, and commit process, thus representing a method to request a brand new working directory, staging area, and project history. New commits are recorded in the history of a current branch, which results in a fork in the project's history. Change list 220 (also called changelist) is a set of local changes that have not yet been committed to a repository. Changelists permit grouping of changes related to different tasks and commit these sets of changes independently. Working copy 225 is where a developer does their work-a personal copy of all files in a project. Individual developers can make arbitrary edits to a working copy (e.g., working copy 225(1)) without affecting the work of other developers. Once finalized, changes can be committed to a given repository. Tag 230 is associated with a commit and can be used to mark an individual point in a repository's history, including a version number for a release.

In one embodiment, and as shown in FIG. 2, HRCP 150(1) can include a unique combination of one or more decoy license files, one or more decoy baselines, one or more decoy branches, one or more decoy change lists, one or more decoy working copies, and/or one or more decoy tags configured to generate honey repository 125(1). Similarly, HRCP 150(2) can include another unique combination of one or more decoy license files, one or more decoy baselines, one or more decoy branches, one or more decoy change lists, one or more decoy working copies, and/or one or more decoy tags configured to generate honey repository 125(2). In some embodiments, unique combinations of one or more decoy—license files, baselines, branches, change lists, working copies, and/or tags—configured to generate a honey repository, can advantageously be based on current and/or historical attacker behavior based on one or more pre-existing and/or non-validated vulnerabilities, and/or cloud misconfigurations.

In one embodiment, D&R server 135 accesses a list of potential honey repositories via an integration between SCS 110 and D&R server 135. In this example, the potential honey repositories (a) include at least honey repository 125 and (b) are not accessible by and/or visible to users of SCS 110 or CIS 130 (e.g., clients 160(1)-(N)). Therefore, honey repositories 125(1)-(N) are only accessible by and/or visible to users (e.g., a potential malicious attackers) who are not part of clients 160(1)-(N) (e.g., based on a secure access log). In this manner, D&R server 135 can configure honeyrepos that include enticing metadata and/or data structures that are decoys and mimicries of real license files, baselines, branches, change lists, working copies, and/or tags to only be accessed and interacted with by a potential attacker. Because honeyrepos do not contain real code (only decoy metadata that mimics a real software development and source control environment), there is no risk (or a reduced risk) in permitting the potential attacker to interact with the honeyrepos and their decoy contents (e.g., for a given amount of time post-access-if access is permitted, for example, to observe attacker behavior)—thus gathering attack intelligence that can inform the subsequent and/or future configuration(s) of other honeyrepos. At the same time, because honeyrepos are not visible to and/or accessible by users of SCS 110 or CIS 130 (e.g., clients 160(1)-(N)), there is no risk (or a reduced risk) that code will be comingled or compromised.

In certain embodiments, D&R server 135, in conjunction with security system 140 and workflow manager 145 can perform defensive cybersecurity remediation operations to thwart an attacker and protect repositories 115(1)-(N) managed by SCS 110 and shared repository 120 accessed by CIS 130, respectively. For example, and as previously noted, as part of disabling access for the attacker, D&R server 135 can interrupt an ongoing unit test and prevent the start of subsequent unit tests as well as commits to shared repository 120 managed by CIS 130. In some embodiments, D&R server 135 can also at least take offline an individual repository that has a higher number of commits than any other individual repository and execute a security orchestration and automation (SOAR) workflow using workflow manager 145 to at least (a) trigger interruption of ongoing unit tests, (b) prevent the start of subsequent unit tests, (c) prevent commits to one or more shared repositories, and (d) block attacker access to a certain branch, working copy, and/or change list of an individual or shared repository.

Figure 3:
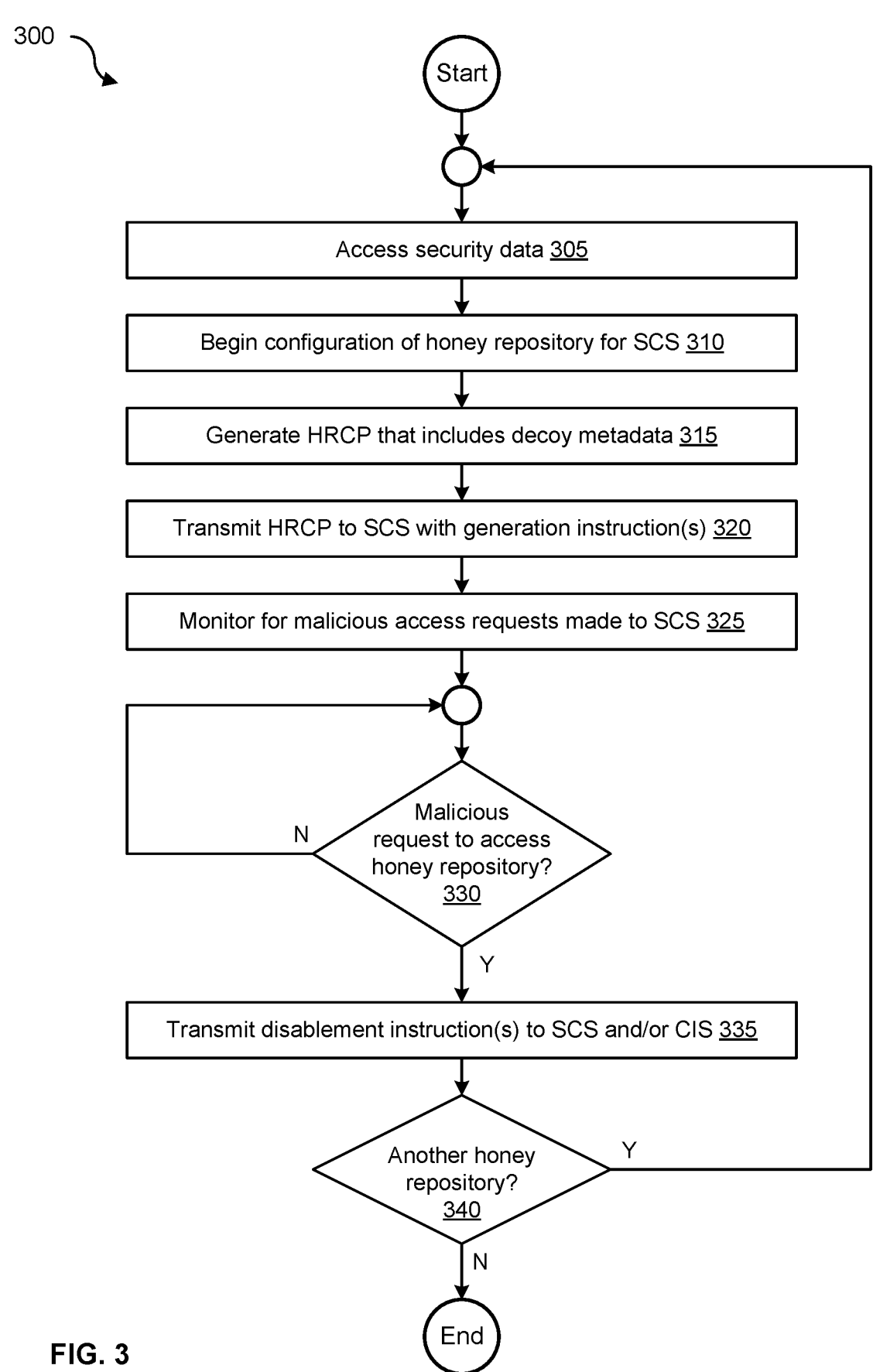
FIG. 3 is a flowchart 300 that illustrates a process to generate a honey repository and monitor malicious access to the honey repository, according to one embodiment of the present disclosure.

FIG. 3 is a flowchart 300 that illustrates a process to generate honeyrepo 125 and monitor malicious access to honeyrepo 125, according to one embodiment. The process begins at 305 by accessing security data (e.g., historical attacker data based on one or more pre-existing and/or non-validated vulnerabilities, and/or cloud misconfigurations, among other factors) and at 310, begins configuration of honeyrepo 125 for SCS 110. At 315, the process generates HRCP 150 that includes decoy metadata 155 (e.g., unique combinations of one or more decoy-license files, baselines, branches, change lists, working copies, and/or tags), and at 320, transmits HRCP 150 to SCS 110 with honeyrepo generation instructions.

At 325, the process monitors SCS 110 for malicious access requests, and at 330 determines whether a malicious request to access honeyrepo 125 has been received. If there is no such request, the process loops to 330. However, if there is a request to access honeyrepo 125, the process, at 335, transmits disablement instructions to SCS 110 and/or CIS 130 (e.g., to take offline an individual repository that has a higher number of commits than any other individual repository and execute a SOAR workflow to trigger interruption of ongoing unit tests, prevent the start of subsequent unit tests, prevent commits to one or more shared repositories, and block attacker access to a certain branch, working copy, and/or change list of an individual or shared repository). In some embodiments, D&R server 135 can instruct SCS 110 to prevent merging and prevent access to a shared mainline (e.g., of shared repository 120). At 340, the process determines if another honey repository is required. If another honey repository is required, the process loops to 305. Otherwise, the process ends.

Determining (a) whether to grant access to the honeyrepo to the potential attacker making the access request, (b) attacker intelligence to be gathered, and (c) disablement, remediation, and/or defensive actions to be taken can be based on the following factors and/or observations: account visits suspicious link, password set to never expire, network access for threat, asset connects to network honeypot, watched impersonation, account authenticated to critical asset, lateral movement domain credentials, lateral movement local credentials, suspicious authentication, wireless multiple country authentications, multiple country authentications, ingress from non-expiring account, ingress from ServiceAccount, service account authenticated from new source, account authenticated to critical asset from new source, new local user primary asset, ingress from disabled account, authentication attempt from disabled account, brute force against domain account, brute force against local account, brute force from unknown source, remote file execution, VirusAlert, log deletion local account, harvested credentials, log deletion, virus alert, network access for threat, malicious hash on asset, advanced malware alert, protocol poison, administrator impersonation, account privilege escalated, account enabled, account password reset, account located, DomainAdmin enabled, and the like.

Figure 4:
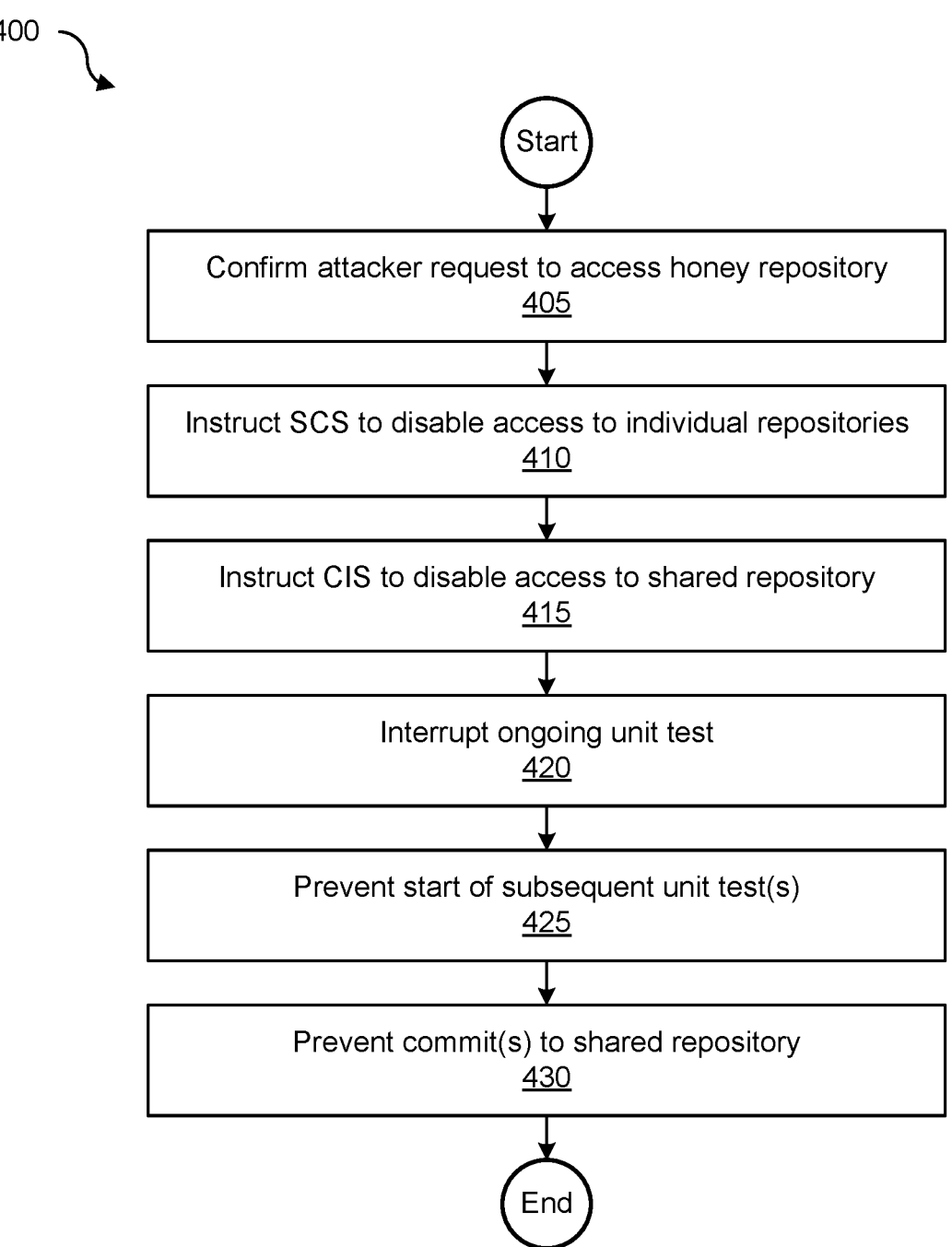
FIG. 4 is a flowchart 400 that illustrates a process to disable malicious access to repositories managed by a SCS and/or a CIS, according to one embodiment of the present disclosure.

FIG. 4 is a flowchart 400 that illustrates a process to disable malicious access to repositories managed by SCS 110 and/or CIS 130, according to one embodiment. The process begins at 405 by confirming an attacker (or potential attacker and/or unauthorized user who is not part of clients 160(1)-(N))) request to access honeyrepo 125. At 410, the process instructs SCS 110 to disable access to individual repositories 115(1)-(N), and at 415, instructs CIS 130 to disable access to shared repository 120. At 420, the process interrupts an ongoing unit test, and at 425, prevents the start of subsequent unit tests. The process ends at 430 by preventing commits to shared repository 120.

Figure 5:
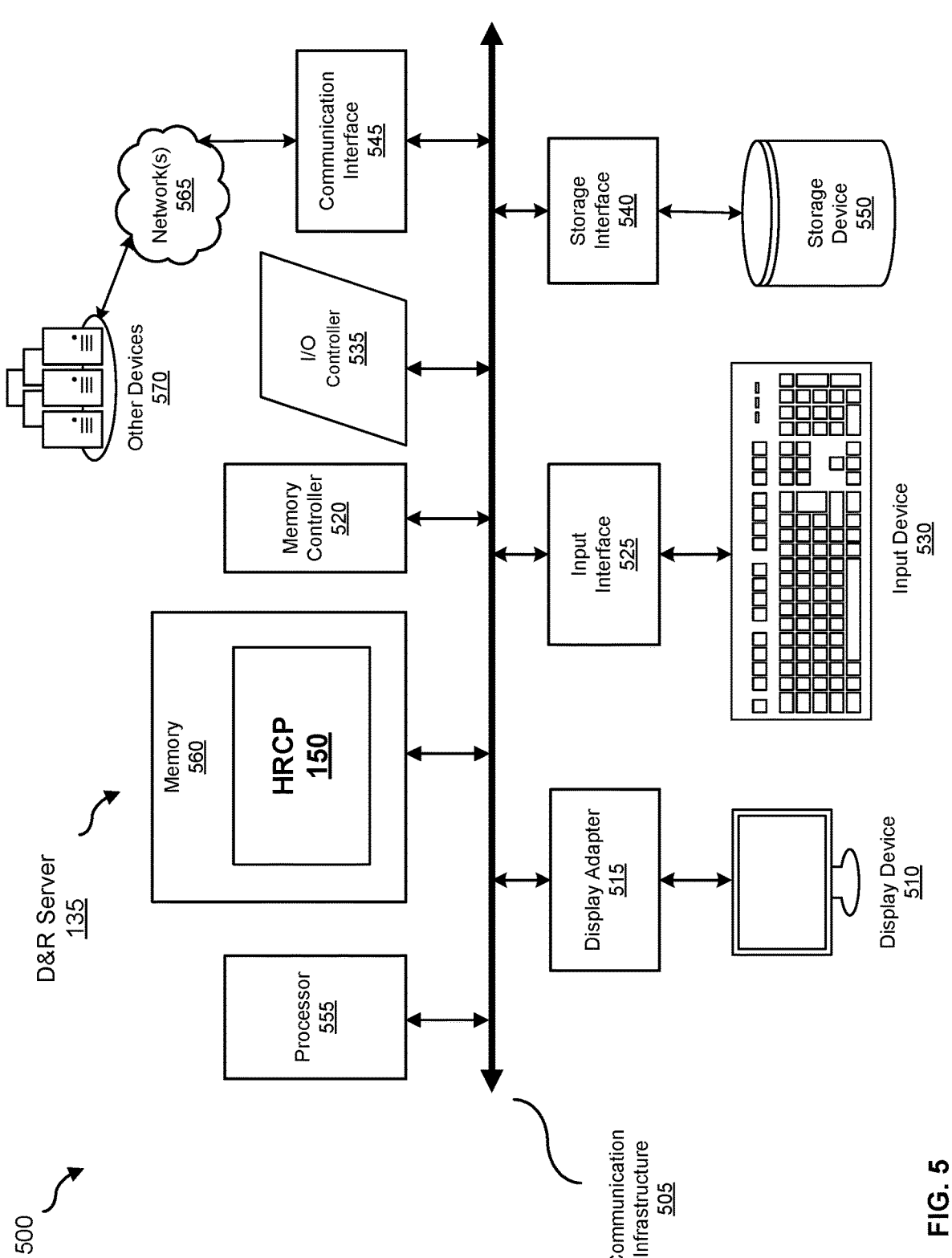
FIG. 5 is a block diagram 500 of a computing system in a networked environment, illustrating how a HRCP can be implemented in software, according to one embodiment of the present disclosure.

FIG. 5 is a block diagram 500 of a computing system, illustrating how a HRCP 150 generated by a D&R server 135 can be implemented in software, according to one embodiment. Computing system 500 can include D&R server 135 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices, network appliances, storage controllers, and the like. In its most basic configuration, computing system 500 may include at least one processor 555 and a memory 560. By executing the software that executes HRCP 150 computing system 500 becomes a special purpose computing device that is configured to perform extended incident detection and response (XDR) operations in computing environments that implement cloud-based source control systems and continuous integration systems for code management Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein.

Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 500 may include both a volatile memory unit and a non-volatile storage device. In one example, program instructions implementing HRCP 150 may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein. I/O controller 535 generally represents any type or form of module capable of coordinating and/or controlling the input and output functions of a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include, a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, and the like.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

Networks 165 and 565 generally represent any type or form of computer network or architecture capable of facilitating communication between D&R server 135 and SCS 110 and/or CIS 130. For example, network 165 or network 565 can be a Wide Area Network (WAN) (e.g., the Internet) or a Local Area Network (LAN). In certain embodiments, a communication interface, such as communication interface 545 in FIG. 5, may be used to provide connectivity between D&R server 135, SCS 110, and/or CIS 130, and network 140. The embodiments described and/or illustrated herein are not limited to the Internet or any particular network-based environment.

In some embodiments, D&R server 135 may be part of cloud 105, or may be separate. If separate, D&R server 135 and cloud 105 may be communicatively coupled via network 140 or network 565. In one embodiment, all or a portion of one or more of embodiments may be encoded as a computer program and loaded onto and executed by D&R server 135, SCS 110, and/or CIS 130, or any combination thereof, and may be stored on cloud 105, D&R server 135, SCS 110, and/or CIS 130, and distributed over network 165 or network 565.

In some examples, all or a portion of D&R server 135, SCS 110, and/or CIS 130 may represent portions of a cloud-computing or network-based environment (e.g., cloud 105). Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, HRCP 150 may transform the behavior of SCS 110 and/or CIS 130 to perform XDR operations in computing environments that implement cloud-based source control systems and continuous integration systems for code management.

In some embodiments, a detection and response (D&R) server that is communicatively coupled to a continuous integration system that accesses (e.g., in addition to or instead of managing) a shared repository and has access to individual repositories of a source control system, configures a honey repository for inclusion in the source control system by generating a honey repository configuration package (HRCP) that includes decoy metadata to entice an attacker to initiate a request to access the honey repository. In some examples, the continuous integration system accesses repositories of the source control system. The continuous integration system includes a service account (e.g., rather than a user account) to permit visibility into multiple repositories being managed by the source control system. In certain embodiments, the HRCP generates stub files (e.g., content files of decoy metadata 155 as shown in FIG. 2) in the honey repository. In some examples, in response to the request by the attacker, the D&R server transmits instructions to at least (a) the continuous integration system to at least disable access for the attacker to the individual repositories of the source control system and the shared repository managed by continuous integration system, respectively, and (b) the source control system to lock out compromised account (e.g., of the attacker) and prevent any more activity from that service account or user.

As noted, a pull request (also called a merge request) is an event that takes place when a contributor or developer is ready to begin the process of merging new code changes with the main project repository. The pull request informs other developers about changes that have been pushed to a branch in a repository. Once a pull request is opened, proposed changes can be discussed and reviewed between collaborators, before follow-up commits are added and the changes are merged into the base branch. In some embodiments, the continuous integration server is set up with a pre-defined configuration or manually to access "known" repositories (e.g., the same access privileges as a "regular" user—i.e., only repositories that are "known" or "needed" are cloned or fetched). Therefore, in this example, a fetch, a clone, or any other activity with respect to the honey repository is a "red flag" regardless of what (content) is inside the actual repository. Typically, an attacker will try to list all available repositories and then clone those repositories blindly before attempting to interact or tamper with said repositories.

In certain embodiments, security system 140 includes a unit test engine 240 to interrupt one or more ongoing unit tests and prevent (the) start of one or more subsequent unit tests related to code that is (a) part of one or more repositories being actively accessed by the attacker or (b) sought to be accessed by the attacker. In some embodiments, the continuous integration server executes the unit test engine. In this example, the security system locks out the service or admin account and then instructs the continuous integration system to stop running unit tests.

As noted, a unit test involves testing individual units of source code to determine the source code's fitness for use. Because individual units of code are typically held in individual repositories (e.g., in one or more of repositories 115(1)-(N)), it is advantageous to interrupt ongoing unit tests to prevent maliciously conducted unit tests from certifying code as fit for use. Such code can be corrupted, can include trojan horses for future execution, and the like. Security system further includes a commit engine 245 to block commits to at least shared repository managed 120 by CIS 130. A commit is an operation which sends latest changes of source code to shared repository 120 (e.g., merges changes from a branch of the source code). Given that shared repository 120 typically contains important source code that is being simultaneously developed by multiple programmers, preventing commits by an attacker to shared repository 120 is particularly advantageous in preventing malicious and extensive modification of important source code.

In certain embodiments, decoy metadata 155 includes at least a license file 205, a baseline 210, a branch 215, a change list 220, a working copy 225, and/or a tag 230 composed of decoy code or decoy data to entice the attacker. In some embodiments, baseline 210 is the main branch for a given repository. However, baseline 210 can also include other files (e.g., passwords.json or keys.txt). Decoy metadata 155 is modeled after (or generated based on) the contents of one or more repositories managed by SCS 110 (e.g., by mimicking, at least partially, metadata or data structures indicative of the contents of repositories 115(1)-(N)). In some embodiments, authorized users do not or should not know about honey repositories—and an access request to any honey repository is a "red flag." As noted, in some embodiments, D&R server 135 can instruct SCS 110 to prevent merging and prevent access to a shared mainline (e.g., of shared repository 120). In other embodiments, another honey repository may be provisioned with a new name if the attacker continues with another (different) attack vector (e.g., to avoid the original honey repository). In some embodiments, the continuous integration server executes the unit test engine. In this example, the security system locks out the service or admin account and then instructs the continuous integration system to stop running unit tests. In other embodiments, the source control system commits the changes. Thus, once the user is locked (out), the user cannot commit any changes.

In one embodiment, (a) scanning, (b) listing, (c) fetching, and/or (d) cloning of one or more repositories is considered a suspicious operation (e.g., a "red flag").

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
accessing a list of one or more potential honey repositories via an integration between a source control system and a detection and response (D&R) server, wherein
the one or more potential honey repositories comprise a honey repository and are not accessible by or visible to one or more authorized users of the source control system or a continuous integration system;
configuring the honey repository for inclusion in the source control system, wherein
the configuring is performed by the D&R server that is communicatively coupled to the continuous integration system that accesses a shared repository and has access to a plurality of individual repositories of the source control system,
the continuous integration system automates software development processes including building, testing, and deployment of source code stored in the source control system, and
the configuring generates a honey repository configuration package (HRCP) that comprises decoy metadata to entice one or more attackers to initiate one or more requests to access the honey repository;
transmitting the HRCP that comprises the decoy metadata to the source control system to generate the honey repository;
monitoring, at the D&R server, access to the source control system;
determining that an attacker has initiated a request to access the honey repository;
in response to the request by the attacker, configuring the source control system and the continuous integration system to disable access for the attacker to the plurality of individual repositories of the source control system and the shared repository managed by the continuous integration system; and
as part of disabling access for the attacker, interrupting an ongoing unit test and preventing start of subsequent unit tests and commits to the shared repository managed by the continuous integration system.

2. The computer-implemented method of claim 1, wherein
the decoy metadata comprises at least a license file, a baseline, a branch, a change list, a working copy, or a tag composed of decoy code or decoy data.

3. The computer-implemented method of claim 1, further comprising:
taking offline an individual repository of the plurality of individual repository that has a higher number of commits than any other individual repository of the plurality of individual repositories.

4. The computer-implemented method of claim 3, further comprising:
executing a security orchestration and automation (SOAR) workflow to trigger the disabling access, the interrupting, and the taking offline.

5. A non-transitory computer readable storage medium comprising program instructions executable to:

access a list of one or more potential honey repositories via an integration between a source control system and a detection and response (D&R) server, wherein the one or more potential honey repositories comprise a honey repository and are not accessible by or visible to one or more authorized users of the source control system or a continuous integration system;

configure the honey repository for inclusion in the source control system, wherein the configuring is performed by the D&R server that is communicatively coupled to the continuous integration system that accesses a shared repository and has access to a plurality of individual repositories of the source control system, the continuous integration system automates software development processes including building, testing, and deployment of source code stored in the source control system, and the configuring generates a honey repository configuration package (HRCP) that comprises decoy metadata to entice one or more attackers to initiate one or more requests to access the honey repository;

transmit the HRCP that comprises the decoy metadata to the source control system to generate the honey repository;

monitor, at the D&R server, access to the source control system;

determine that an attacker has initiated a request to access the honey repository;

in response to the request by the attacker, configure the source control system and the continuous integration system to disable access for the attacker to the plurality of individual repositories of the source control system and the shared repository managed by the continuous integration system; and as part of disabling access for the attacker, interrupt an ongoing unit test and preventing start of subsequent unit tests and commits to the shared repository managed by the continuous integration system.

6. The non-transitory computer readable storage medium of claim 5, wherein the decoy metadata comprises at least a license file, a baseline, a branch, a change list, a working copy, or a tag composed of decoy code or decoy data.

7. The non-transitory computer readable storage medium of claim 5, further comprising:

taking offline an individual repository of the plurality of individual repository that has a higher number of commits than any other individual repository of the plurality of individual repositories.

8. A system comprising:

one or more processors; and a memory coupled to the one or more processors, wherein the memory stores program instructions executable by the one or more processors to:

access a list of one or more potential honey repositories via an integration between a source control system and a detection and response (D&R) server, wherein the one or more potential honey repositories comprise a honey repository and are not accessible by or visible to one or more authorized users of the source control system or a continuous integration system;

configure the honey repository for inclusion in the source control system, wherein the configuring is performed by the D&R server that is communicatively coupled to the continuous integration system that accesses a shared repository and has access to a plurality of individual repositories of the source control system, the continuous integration system automates software development processes including building, testing, and deployment of source code stored in the source control system, and the configuring generates a honey repository configuration package (HRCP) that comprises decoy metadata to entice one or more attackers to initiate one or more requests to access the honey repository;

transmit the HRCP that comprises the decoy metadata to the source control system to generate the honey repository;

monitor, at the D&R server, access to the source control system;

determine that an attacker has initiated a request to access the honey repository;

in response to the request by the attacker, configure the source control system and the continuous integration system to disable access for the attacker to the plurality of individual repositories of the source control system and the shared repository managed by the continuous integration system; and as part of disabling access for the attacker, interrupt an ongoing unit test and preventing start of subsequent unit tests and commits to the shared repository managed by the continuous integration system.

9. The system of claim 8, wherein the decoy metadata comprises at least a license file, a baseline, a branch, a change list, a working copy, or a tag composed of decoy code or decoy data.

10. The system of claim 8, further comprising:

taking offline an individual repository of the plurality of individual repository that has a higher number of commits than any other individual repository of the plurality of individual repositories.

11. The system of claim 10, further comprising:

executing a security orchestration and automation (SOAR) workflow to trigger the disabling access, the interrupting, and the taking offline.

* * * * *